Patented May 30, 1939

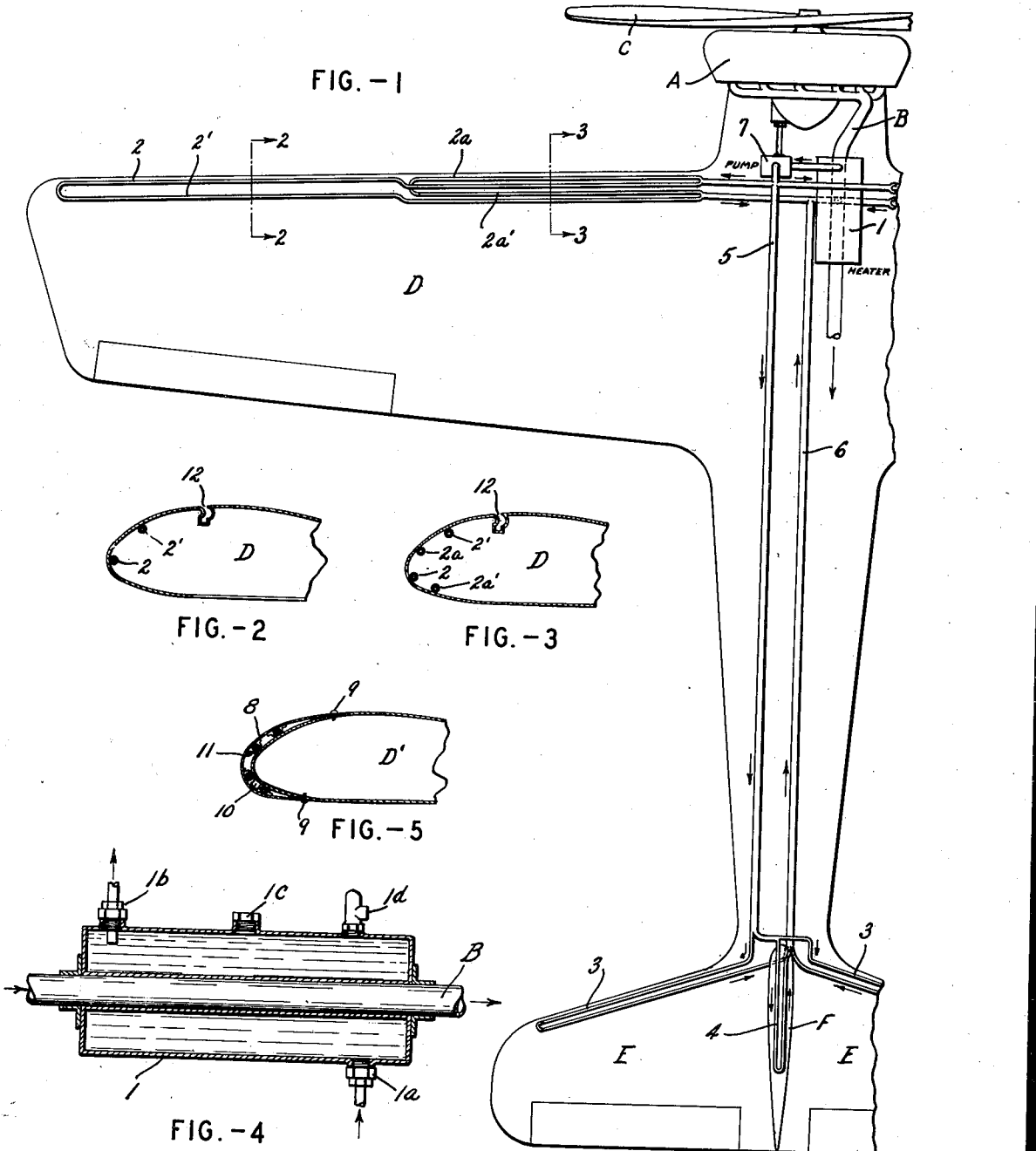

2,160,397

UNITED STATES PATENT OFFICE 2,160,397

DEFROSTER FOR AIRCRAFT

Frederick G. Brammer, North Olmstead, Ohio

Application October 5, 1936, Serial No. 104,044

2 Claims. (Cl. 244—134)

This invention relates to means for preventing ice formation on the wings, fins and like members of aircraft having internal combustion engine propulsion, and the object of the invention is to apply to the leading edges of such members, heat obtained from the engine products of combustion, by novel heat exchanging apparatus.

Briefly, and as further objects of the invention, liquid is employed for the purpose in a closed circulating system including a heat accumulator associated with the engine and a heat dissipator associated wth the member exposed to ice formation. Other objects of the invention reside in the novel and simple form and arrangement of the heat dissipator employed.

The exact nature of the invention together with further objects and advantages thereof will be apparent from the following description taken in connection with the accompanying drawing in which Fig. 1 is a diagrammatic and otherwise conventionalized plan view of an airplane including structure embodying the invention; Figs. 2 and 3 are details in sectional elevation as in the planes of lines 2—2 and 3—3 respectively, Fig. 1; Fig. 4 is a sectional elevation of a heat exchanger appearing in Fig. 1; and Fig. 5 is a view corresponding to Figs. 2 and 3 but showing a modified construction.

With reference now to the drawing the principal indicated parts of the illustrated airplane are the engine A having an exhaust pipe B, propeller C driven by the engine, and structural members of the plane proper including wings D, tail planes E and fin F.

As is well known in the art the leading edges of all of these structural members are subject to dangerous ice formation under certain flying conditions.

According to this invention I provide a heat exchanger at or adjacent the engine for accumulating heat from the products of combustion of the engine, in liquid, contained within the accumulator. Conveniently this accumulator is associated with the engine exhaust pipe B and it may be in the form of a tank 1 surrounding the exhaust pipe and having the inlet opening 1a, outlet opening 1b, filler opening 1c, and safety valve 1d.

For each plane member to be heated I provide a tubular conductor which may be simply of seamless aluminum or copper tubing. Each conductor is disposed generally along the leading edge of its member with a leading stretch directed generally from the heater 1 and a return stretch adjacent the leading stretch and directed generally back toward the heater. Thus as indicated in Fig. 1, the plane members D, E and F are provided with conductors 2, 3 and 4 respectively.

Means are provided interconnecting these heat-dissipating conductors and the heater 1 in such manner that there may be circulation of liquid from the heater 1 through the conductors in parallel relation with each other, and through the leading stretch before the return stretch of each conductor. Such means include the feeding header pipe 5 and return header pipe 6 and a pump 7 located in one of these pipes, as the feeding header 5, and arranged to be driven by the engine A. These header pipes have branches as indicated for the purpose described, and their connections may be made by welding or fittings. In the drawing the connections with the conductors are indicated as welded and those with the heater 1 as by threaded fittings.

As shown in Fig. 1 the headers have lateral branches leading to the wing conductors and rearward branches leading to the rearward conductors, the conductors themselves being in parallel relation with each other and each conductor having its leading stretch supplied from the feeding header 5 and its return stretch leading to the return header 6. Thus when the engine is operating to drive the pump 7 and heat the liquid within the tank 1, flow will be as indicated by the arrows in Fig. 1, in a closed system wherein liquid is heated in the tank 1, delivered by the pump to the conductors where it delivers its heat to the plane members, and thence back to be reheated.

More particularly as to disposition of the conductors relative to the members which they are to heat, each conductor has its two stretches located to deliver their heat to the leading edge of its member, and to this end the leading stretch, which will be the hotter of the two stretches, is located more nearly the forward extremity of the member than the return stretch, which, however, is disposed adjacent the leading stretch. Thus as indicated in Fig. 2, the leading stretch 2 of the conductor by which the wing D is heated, is located at the forward extremity of the wing while its return stretch 2' is located above and somewhat rearward, but still in the zone in which some ice will tend to form.

If desired a trough 12 may be provided on the upper surface of the wing, to provide drainage of water.

Since there is more tendency to ice formation on the wing, in the slip stream of the propeller C, a second conductor may be here provided alongside the conductor 2. As indicated in Fig. 3 the arrangement of the adjacent stretches of the two conductors is preferably such that their leading stretches 2 and 2a are disposed between their return stretches 2' and 2a', so that the maximum heat is imparted to the forward extremity of the wing and the best heat distribution is had across the section.

As to mounting of the conductors, in new construction they are preferably located within the confines of the members they are to heat, as indicated in Figs. 2 and 3, by any convenient mounting means. When the heating system is to be added to an old plane, however, the arrangement of Fig. 5 is preferable. This comprises the employment of a sheath 8 of sheet metal or the like formed for attachment along the forward edge of the member as by screws 9, to provide a cavity 10 immediately ahead of the member without materially affecting the contour characteristics of the latter. The conductors are disposed within this cavity, their stretches being secured to the sheath 8 as by straps 11 welded to the latter so that the sheathing and conductors may be handled as a unit in mounting or demounting.

In practice the liquid system is maintained substantially full of liquid which is preferably of a character having a high boiling point and low freezing point, such as a mixture containing glycerin or oil. The pipe size of the headers and conductors need not be great nor need the heater I have high heating capacity, as I have found that high temperatures are not necessary for prevention of ice formation.

What I claim is:

1. In an aircraft having an internal combustion engine, a propeller driven by the engine and a wing having a portion aft of the propeller and extending therebeyond, means for heating the leading edge portion of said wing by liquid heated from said engine during its operation and comprising heat accumulating means arranged to contain liquid and associated with said engine to heat its contents by the engine products of combustion, heat dissipating means associated with said wing and comprising a pair of tubular conductors each having a stretch leading along said wing edge portion with a return stretch alongside its leading stretch, and means interconnecting said conductors with said heat accumulating means to provide circulation of the heated liquid through said conductors in parallel relation, the stretches of one of said conductors extending substantially entirely along said wing edge, and those of the other conductor extending substantially only through the propeller slip stream.

2. In an aircraft having a member exposed to ice formation which is provided with a leading edge, an internal combustion engine having an exhaust pipe, a tank containing a liquid in heat exchange relationship with said exhaust pipe, heat dissipating means associated with said tank, said heat dissipating means comprising a plurality of tubular conductors each having a stretch leading along the leading edge of said member with a return stretch alongside said leading stretch, communicating means between said leading stretches and the upper portion of said tank, communicating means between said return stretches and the lower portion of said tank, and liquid moving means for forcing liquid from the upper portion of said tank to the leading stretches and returning it to the lower portion of the tank through said return stretches, the leading stretches of said conductors being disposed between the return stretches and lying in a position which is in closer proximity to the leading edge of said member than the return stretches.

FREDERICK G. BRAMMER.